(12) United States Patent
Jiang et al.

(10) Patent No.: US 10,343,113 B2
(45) Date of Patent: Jul. 9, 2019

(54) APPARATUS AND METHOD FOR ABSORBING AND MINERALIZING CARBON DIOXIDE

(71) Applicants: Yuanchu Technology (Beijing) Co., Ltd., Beijing (CN); Tsinghua University, Beijing (CN)

(72) Inventors: Guoqiang Jiang, Beijing (CN); Jiantao Zhang, Beijing (CN); Changjun Yu, Beijing (CN); Haichuan Ding, Beijing (CN)

(73) Assignees: YUANCHU TECHNOLOGY (BEIJING) CO., LTD., Beijing (CN); TSINGHUA UNIVERSITY, Beijing (CN)

( * ) Notice: Subject to any disclaimer, the term of this patent is extended or adjusted under 35 U.S.C. 154(b) by 209 days.

(21) Appl. No.: 15/276,218

(22) Filed: Sep. 26, 2016

(65) Prior Publication Data
US 2017/0182458 A1    Jun. 29, 2017

(30) Foreign Application Priority Data

Dec. 29, 2015   (CN) .......................... 2015 1 1016729

(51) Int. Cl.
  B01D 53/14        (2006.01)
  B01D 53/18        (2006.01)
      (Continued)
(52) U.S. Cl.
  CPC ......... B01D 53/62 (2013.01); B01D 53/1475 (2013.01); B01D 53/1493 (2013.01);
      (Continued)

(58) Field of Classification Search
  None
  See application file for complete search history.

(56) References Cited

U.S. PATENT DOCUMENTS 4,229,417 A  *  10/1980  Kanai ................... B01D 53/60
                                              422/176

FOREIGN PATENT DOCUMENTS

| CA | 2 778 125 A1 | 4/2011 |
| CN | 2791027 Y | 6/2006 |

(Continued)

*Primary Examiner* — Colleen P Dunn
(74) *Attorney, Agent, or Firm* — Westman, Champlin & Koehler, P.A.

(57) ABSTRACT

The present invention relates to an apparatus for absorbing and mineralizing carbon dioxide comprising a reactor and a three-phase separator, in which said reactor comprises a tower body and a draft tube disposed inside the tower body, a liquid inlet pipe and a gas intake pipe being disposed on the tower body, the outlet ends of the liquid inlet pipe and the gas intake pipe both being located inside the draft tube; and the three-phase separator is disposed at the upper end of the reactor, and a method therefor. The arrangement of draft tube inside the reactor of the present invention, enhances gas-liquid-solid mixing state because of the flow with airlift loop flow inside the reactor, accelerates the dissolution rate of solid alkali solute and thus may increase absorption reaction rate and absorptivity; the integration of three-phase separator in the reaction apparatus may isolate carbonate by settling while reacting, reduce solid content of the solution, while reducing the circulation of water between absorption and separation units, improve process performance, reduce process energy consumption; carbonate particles generated can be controlled better, thus a higher settling efficiency can be obtained.

17 Claims, 2 Drawing Sheets

(51) Int. Cl.
*B01D 53/62* (2006.01)
*B01D 53/80* (2006.01)
(52) U.S. Cl.
CPC ............ *B01D 53/18* (2013.01); *B01D 53/80* (2013.01); *B01D 2251/402* (2013.01); *B01D 2251/404* (2013.01); *B01D 2251/604* (2013.01); *B01D 2251/608* (2013.01); *B01D 2251/80* (2013.01); *B01D 2252/20484* (2013.01); *B01D 2252/20489* (2013.01); *B01D 2257/504* (2013.01); *B01D 2258/0283* (2013.01); *Y02C 10/04* (2013.01); *Y02C 10/06* (2013.01)

(56) References Cited

FOREIGN PATENT DOCUMENTS

| | | |
|---|---|---|
| CN | 1970692 A | 5/2007 |
| CN | 101050190 A | 10/2007 |
| CN | 101249405 A | 8/2008 |
| CN | 101985381 A | 3/2011 |
| CN | 102658014 A | 9/2012 |
| CN | 104907010 A | 9/2015 |
| CN | 205495307 U | 8/2016 |
| GB | 2515995 A | 1/2015 |
| WO | 2014/039578 A1 | 3/2014 |

\* cited by examiner

APPARATUS AND METHOD FOR ABSORBING AND MINERALIZING CARBON DIOXIDE

CLAIM OF PRIORITY

This application claims the benefit of Chinese Patent Application No. 201511016729.9, filed on Dec. 29, 2015, which is incorporated herein by reference in its entirety.

BACKGROUND OF THE DISCLOSURE

Field of the Disclosure

The present invention relates to the field of carbon dioxide mineralization, especially an apparatus and method for absorbing and mineralizing carbon dioxide.

Description of the Related Art

Collection and disposal of carbon dioxide ($CO_2$), for reducing greenhouse gas emissions, is an important technical problem in the field of the environment and ecology. Currently, $CO_2$ collection and disposal mainly includes geological storage, ocean storage, mineral carbonation and biological carbon sequestration. $CO_2$ mineral carbonation sequestration refers to a series of processes in which $CO_2$ reacts with minerals containing alkaline or alkaline-earth metal oxides (mainly calcium and magnesium silicate minerals) to produce carbonate thus to be stored. Mineral carbonation is the $CO_2$ sequestration process in the nature, the resulting carbonates are thermodynamically stable form for carbon, and without any impact on the environment, and therefore mineral carbonation is a most stable and safest way of carbon sequestration; and, various minerals which can react with $CO_2$ exist in the nature, with huge capacity and low prices; therefore, mineral carbonation carbon sequestration is one of the best approaches among $CO_2$ collection and disposal technologies.

Currently, reported $CO_2$ carbonation sequestration processes and technologies includes direct dry gas-solid carbonation and liquid phase absorption carbonation. Direct dry gas-solid carbonation employs the route in which $CO_2$ react with minerals directly in one step gas-solid reaction to produce carbonate. This route is handicapped by low reaction rate and low efficiency, even performed under high pressure; it is difficult to meet the need of large-scale industrial absorption. Therefore, liquid phase absorption carbonation is considered to be the major route for mineral carbonation sequestration.

There are two different routes for liquid phase absorption carbonation, namely the direct and indirect absorption methods. Direct absorption method is as followed, after the calcium magnesium silicate (also the like minerals) is crushed into fine particles and dispersed into liquid phase, reacting with $CO_2$ to produce carbonate. The chemical reaction of direct absorption method is the same with direct gas solid carbonation, just as in liquid phase, the $CO_2$ is dissolved to form carbonate, while further reacting with fine mineral particles, by which the reaction rate has been improved. Cost of grinding minerals is very high, but the reaction rate still cannot meet the needs of large-scale absorption; therefore this method is still not the best choice in economy and efficiency.

In the indirect liquid phase absorption method, the minerals are first converted to alkaline solution or suspension (hereinafter referred to as alkali liquor), absorbing $CO_2$ in the alkali liquor to form carbonates, and the carbonates are further separated to sequestration $CO_2$. Two core steps of the method are conversion of the minerals and $CO_2$ absorption. Depending on the minerals employed and different routes of converting to alkali liquor, different processes can be obtained; and according to different absorption-reaction systems (solutions, suspensions or emulsions), there are also different technical solutions for absorption and reaction. With regard to the technologies and characteristics of various solutions, they are discussed in details in the articles "Carbon capture and storage using alkaline industrial waste (Progress in Energy and Combustion Science, 38: 302-320) and "A review of mineral carbonation technology in sequestration of $CO_2$ (Journal of Petroleum Science and Engineering, 109: 364-392).

Due to the widely existing and low price of sodium salts, as well as the high solubility of NaOH, the process of employing the sodium salts as absorbing mineral is firstly proposed and industrialized. A typical process is, for example, the process employing $NaHCO_3/Na_2CO_3$ as carbonates as disclosed in PCT patent WO2009039445 (Chinese Patent CN101970084A). In addition, similar technology is the absorbing technology reported in PCT patent WO2010068924 (Chinese patent CN101896425A). Generally in these patents, by electrolyzing sodium salts (such as $Na_2SO_4$) to obtain NaOH and $CO_2$ is reacted with NaOH to obtain $NaHCO_3$ or $Na_2CO_3$. Patent WO2009039445 also discloses the design and the structure of bubble column employed in the absorption. But the technology is lack of competitiveness in economy because electrolysis to obtain NaOH is high energy consuming. However, since the solubility of NaOH in water is high, the absorption process is a neutralization reaction in solution, with a fast reaction rate, and the reactor design is also relatively simple.

The true meaning of indirect liquid absorption method lies in the use of calcium magnesium silicates with great reserves and low prices for the absorption of $CO_2$, and carbonates such as $CaCO_3$, $MgCO_3$ and the like with solid state are finally produced. This method generally converts the calcium magnesium silicates to oxides and further produce alkaline, and then reacts with $CO_2$ in a suspension or emulsion of the alkaline, generating carbonates. For example, PCT patent WO2013106730 (Chinese Patent CN104284707A) discloses an indirect route in which calcium silicates are employed, with HCl used as medium and magnesium salts used as OH-carrier. In this process, the absorption of $CO_2$ is achieved by reacting with $Ca(OH)_2$, $Mg(OH)_2$, or a mixture of $Mg(OH)_2$ and $CaCl_2$ to produce carbonates. Besides, similar process is the process employed acetic acid as medium. The document "Characteristics of $CO_2$ fixation by chemical conversion to carbonate salts" (Chemical Engineering Journal, 231: 287-293) reports the process in which $CO_2$ is absorbed in ethanolamine (MEA), diethanolamine (DEA), or methyl diethanolamine (MDEA), in which $CaCl_2$ is dissolved to generate carbonates. In these processes above mentioned, a core process is concerned that $CO_2$ is dissolved in the liquid phase and reacted to produce carbonates. The dissolution rate of $CO_2$, the dissolution rate of the alkaline chemicals and the precipitation and crystallization rate of carbonate will all affect absorption efficiency, and any of these steps is likely to be a control step in the absorption process, usually when this absorption reaction is carried out with a simple bubbling method in a bubble column, $CO_2$ absorption and reaction rate is usually not high enough. For example, when absorption and conversion are carried out with an alkali metal hydroxide, since the solubility of this kind of hydroxides is very low, if absorbed with solution, the absorption capacity is very low, resulting in circulation of large amount of water at the same time, and therefore it is necessary to absorb $CO_2$ with hydroxide suspension. Related kinetic studies show that the dissolution of hydroxide is the control step of suspension absorption process in which the kinetics characteristics is different from solution absorption. On the other hand, in conventional absorption reactions, absorption and separation are carried out in separate units, since the content of the carbonate is usually not high, which leads to transportation or circulation of large amount of water from the absorption unit to the separation unit, resulting in large energy consumption. So far, there is still no public report for this absorption process to specially develop absorption reactor integrated with reaction and separation with high efficiency.

BRIEF DESCRIPTION OF THE DISCLOSURE

In view of this, object of the present invention is to provide an reactor for carbon dioxide absorption and mineral carbonation and a method therefor, in order to solve the above technical problems present in the prior art.

According to the first aspect of the present invention, an apparatus for absorbing and mineralizing carbon dioxide comprising a reactor and a three phase separator is provided; said apparatus is arranged vertically and comprises a tower body and a draft tube; said draft tube being disposed inside the tower body, a liquid inlet pipe and a gas intake pipe being disposed on the tower body, the outlet ends of said liquid inlet pipe and said gas intake pipe both passing through said tower body and being located inside said draft tube; said three-phase separator includes a housing, a riser tube and a downcomer, the lower end of said housing being connected to the upper end of said reactor, the lower end of said riser tube also communicating with the reactor, with the upper end extending inside the downcomer, an opening being disposed at lower end of downcomer, a down flow channel being formed between said riser tube and said downcomer; a settling zone being formed between said housing and said downcomer, said down flow channel communicating with the settling zone.

Preferably, said draft tube is provided with openings at the upper and the lower ends, the outlets of said liquid inlet pipe and said gas intake pipe being located inside the opening of the lower end of said draft tube, and the outlet of said liquid inlet pipe being located above the outlet of said gas intake pipe.

Preferably, a gas distributor is provided at the outlet of said liquid inlet pipe.

Preferably, said tower body and said draft tube are both cylindrical configuration, with a height ratio of 0.5:1 to 0.8:1 and a diameter ratio of 0.6:1 to 0.75:1 thereof.

Preferably, sieve pores are provided on said draft tube, the area of all the said sieve pores is less than 0.4 times of the cross-section area of said draft tube.

Preferably, said three phase separator comprises a first drain pipe, a gas outlet and a second drain pipe, said first drain pipe being used for discharging supernatant liquid in the three-phase separator, said gas outlet being used for discharging the treated gas, and said second drain pipe being used for discharging bottom liquid in said three-phase separator.

Preferably, said first drain pipe and second drain pipe are located on upper portion and bottom portion of said setting zone, respectively, and said gas outlet is located at the upper end of said housing.

Preferably, the ratio of the cross-sectional area of said setting zone along radial direction of said housing to that along radial direction of said tower body is 1.5:1 to 4:1.

Preferably, further comprising an overflow weir, said overflow weir is disposed inside said housing along the circumferential direction, and fixed on lower side of said first drain pipe.

Preferably, an overflow groove with an upward opening is formed by said overflow weir and inner wall of the housing, the height difference between the opening edge of said overflow groove and the upper end of the riser tube is 0.3 to 1 times of the diameter of said riser tube.

According to the second aspect of the present invention, a method for absorbing and mineralizing carbon dioxide is provided, in which carbon dioxide is absorbed and mineral carbonated with alkali liquor by using the above mentioned integrated reactor for carbon dioxide absorption and mineral carbonation; the volume fraction of carbon dioxide in the gas to be treated is 0.05% to 20%, the volume of carbon dioxide intake per minute is 0.02 to 0.2 times of the volume of said reactor; the superficial gas velocity calculated by entirety of volume is 0.5~8 cm/s.

Preferably, said alkali liquor reacts with carbon dioxide to generate a solution or suspension of insoluble carbonate matter.

Preferably, said alkali liquor is a suspension of calcium and/or magnesium hydroxide wherein the content of hydroxide is 1~1500 times of its saturation solubility; the ratio of the molar flow rate of the hydroxide ion to the molar flow rate of the carbon dioxide is 0.5:1 to 4:1.

Preferably, said alkali liquor is a suspension of mixture of calcium and/or magnesium hydroxide and hydrochloride or sulfate of calcium and/or magnesium, in which the content of the hydroxide is 1 to 1,500 times of its saturation solubility thereof, the molar ratio of salts to hydroxides is 0:1 to 4:1; the ratio of molar flow rate of hydroxide ion to the molar flow rate of carbon dioxide is 0.5:1 to 4:1.

Preferably, said alkali liquor is a solution of weak acid salt of calcium and/or magnesium, the pKa value of the acid corresponding to weak acid radical contained is greater than the pKa value of carbonic acid; and the ratio of the molar flow rate of the weak acid radical to the molar flow rate of carbon dioxide is 2:1 to 10:1.

Preferably, said alkali liquor is aqueous ammonia dissolved with hydrochloride or sulfate of calcium and/or magnesium, the mass fraction of ammonia is 2 to 20%, the molar ratio of salt to ammonia is 0.2:1 to 2:1; the ratio of molar flow rate of ammonia to molar flow rate of carbon dioxide is 0.5:1 to 4:1.

Preferably, said alkali liquor is ethanolamine, diethanolamine, or a mixture of methyldiethanolamine with aqueous solution of sulphate or hydrochloride of calcium and/or magnesium, the mass fraction of ethanolamine, diethanolamine, or methyldiethanolamine is 5 to 30%, the molar ratio of the salts to said alcohol amine is 0.2:1 to 2:1; and the ratio of molar flow rate of amine group to molar flow rate of carbon dioxide is 0.5:1 to 4:1.

In the apparatus for absorbing and mineralizing carbon dioxide, the arrangement of draft tube inside the reactor enhances the gas-liquid-solid mixing because of the flow with air-lift circulation around the draft tube, enhances the dissolution rate of solid alkali and thus may accelerate macroscopical absorption reaction and absorptivity; the integration of three-phase separator in the apparatus may isolate carbonate by settling while reacting, reduce solid content of the solution, while reduce the transportation of water in absorption and separation unit, improve process performance, reduce process energy consumption; carbonate particles generated can be controlled better, thus a higher settling performance can be obtained.

BRIEF DESCRIPTION OF THE DRAWINGS

By reference to the accompanying drawings describing embodiments of the invention as followed, the above and other objects, features and advantages of the present invention will become more apparent, in the drawings.

DETAILED DESCRIPTION OF EMBODIMENTS OF THE DISCLOSURE

Figure 1:
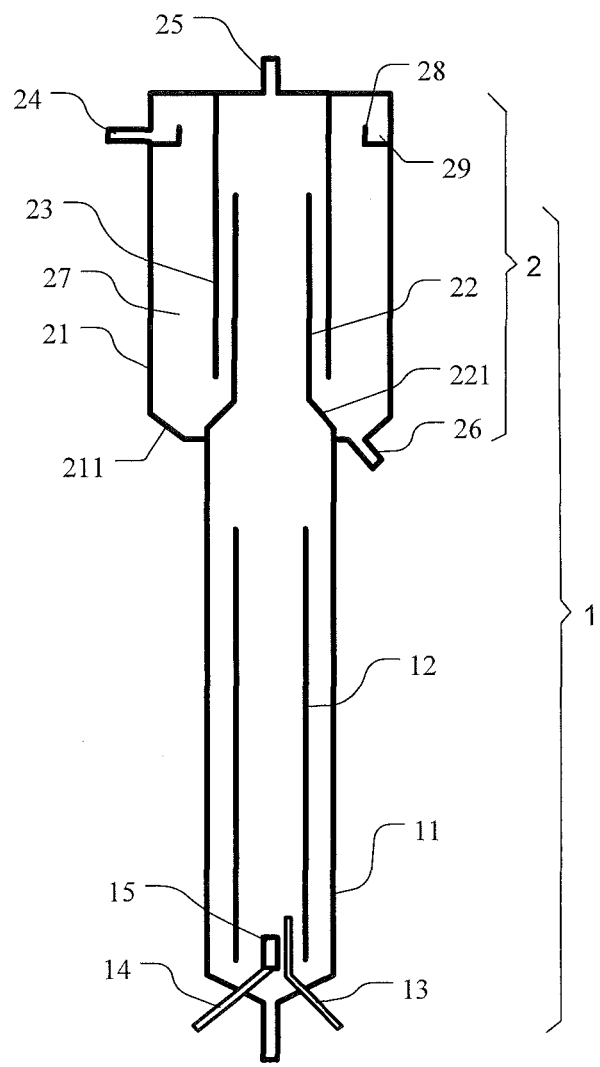
FIG. 1 is a schematic view of structure of the reactor for carbon dioxide absorption and mineral carbonation of the present invention.

Various embodiments of the present invention are described in more details with reference to accompanying drawings as followed. In the accompanying drawings, the same or similar reference numerals are shown with same elements. For clarity, every parts in the drawings are not drawn to scale.

As shown in FIG. 1, the present invention provides a reactor for carbon dioxide absorption and mineral carbonation comprising a reactor 1 arranged vertically and a three phase separator 2 disposed at upper end of the reactor 1, and the reactor 1 and the three phase separator 2 communicating with each other.

As shown in FIG. 1, the reactor 1 comprises a tower body 11, a draft tube 12, a liquid inlet pipe 13 and a gas intake pipe 14. The tower body 11 has a tubular configuration, preferably a cylindrical configuration, with a ratio of height to diameter of 5:1 to 9:1, the draft tube 12 has a tubular shape disposed with openings at both upper and lower ends, being provided in the inside the tower body 11, with a ratio of height thereof to the height of tower body 11 of 0.5:1 to 0.8:1, with a ratio of diameter thereof to the diameter of said tower body 11 of 0.6:1 to 0.75:1, said draft tube 12 vertically disposed along the axial direction of said tower body 11, preferably, said draft tube 12 being collinear with the axial direction of said tower body 11, and the end located at lower side of the draft tube 12 being adjacent to lower end of said tower body 11; further, the cylinder wall of the draft tube 12 is provided with a sieve pores (not shown), the area of the sieve pores is smaller than 0.4 times of the cross-section area of the draft tube 12. The liquid inlet pipe 13 and gas intake pipe 14 are both provided at lower end of the tower body 11, and the outlet ends of the liquid inlet pipe 13 and gas intake pipe 14 both pass through the tower body 11 and are located inside the opening of lower end of the draft tube 12, preferably, the outlet end of the gas intake pipe 14 is located on the axial direction of the draft tube 12 and the difference in height of the outlet end of the gas intake pipe 14 from the height of the lower end of the draft tube 12 is not greater than ⅛ of the height of the draft tube 12, or the height difference is not greater than 50 cm; the outlet end of the liquid inlet tube 13 is higher than the outlet end of the gas intake pipe 14. In order to enable gas to evenly distribute, preferably, a gas distributor 15 is further provided, the gas distributor 15 being connected to the outlet end of the gas intake pipe 14, and the gas distributor 15 being located at lower side of outlet end of the liquid inlet pipe 13 in the vertical direction.

The three-phase separator 2 includes a housing 21, a riser tube 22, a downcomer 23, a first drain pipe 24, a gas outlet 25 and a second drain pipe 26, the housing 21 is preferably cylindrical configuration, the diameter ratio of housing 21 to tower body 11 is 1.5:1 to 2.5:1, the height ratio of the housing 11 to the tower body 21 is 1:2 to 1:4, the upper end of housing 21 is in a closed state, the lower end thereof is provided with a housing connection portion 211, the housing connection portion 211 has a cylindrical configuration, and the diameter of the first end thereof is same as the diameter of the housing 21, the second end thereof is same as the diameter of tower body 11, the first end and second end of the housing connection portion 211 are connected to the outer walls of the housing 21 and tower body 11, respectively, connecting the housing 21 to tower body 11 together, preferably, the housing 21 and the tower body 11 are axially collinear. The diameter of the riser tube 22 is equal to or smaller than the diameter of the tower body 11, is greater than or equal to the diameter of the draft tube 12 and has a length less than the length of the housing 21, the riser tube 22 is connected with riser tube connecting portion 221 to the upper end of the tower body 11, the riser tube connecting portion 221 is a cone shaped pipe, the diameter of the first end thereof is same as the diameter of the riser tube 22, the diameter of the second end thereof is same as the diameter of the tower body 11, the first and second ends of the riser tube connecting portion 221 are connected to the riser tube 22 and tower body 11, respectively, connecting the riser tube 22 to tower body 11 together, preferably, the riser tube 22 and tower body 11 are axial collinear. The setting zone 27 is formed between the outer wall of the riser tube 22 and the inner wall of the housing 21, the volume ratio of the setting zone 27 to the tower body 11 is 1:1 to 3:1, the ratio of the cross-sectional area of the setting zone 27 along the radial direction of the housing 21 to that along the radial direction of the tower body 11 is 1.5:1 to 4:1. The downcomer 23 is disposed within the housing 21, having a diameter greater than the diameter of the riser tube 22 and less than the diameter of the housing 21, the ratio of the cross-sectional area of the downcomer 23 in the radial direction thereof to the cross-sectional area of the setting zone 27 is 1:6 to 1:4, the length of the downcomer 23 is less than the length of the housing 21, the first end of the downcomer 23 is connected to the top portion in sealing state of housing 21, and riser tube 22 is partially located within the downcomer 23, preferably, the downcomer 23 is axial collinear with riser tube 22, and a down flow channel 20 is formed between the downcomer 23 and riser tube 22, the down flow channel 20 communicates with the setting zone 27.

The first drain pipe 24, the gas outlet 25 and the second drain pipe 26 are provided on the housing 21, the first drain pipe 24 is provided on the side wall of the housing 21, and is located adjacent to the sealed end of housing 21; the gas outlet 25 is provided on the end surface of the sealed end of the housing 21, and the gas outlet 25 is located within the downcomer 23; the second drain pipe 26 is provided on the housing connection portion 211. Preferably, the housing 21 is also provided with an overflow weir 28, the overflow weir 28 is disposed on the inner wall of the housing 21 along circumferential direction, the overflow weir 28 is fixed at the lower side of the opening of the drain pipe 24, an overflow weir 29 with the opening which is disposed at the upper side is formed between the overflow weir 28 and the inner wall of the housing 21, and the height difference between the opening edge of the overflow weir 29 and the upper end of the riser tube 22 is 0.3 to 1 times of the diameter of the riser tube 22.

The reactor for carbon dioxide absorption and mineral carbonation provided in the present invention arranges the reactor 1 and the three-phase separator 2 to become an integrity, which not only simplifies the equipment, but also achieves the integration of reaction and separation, improves processing efficiency, reduces energy consumption. And the three-phase separator 2 facilitates to separate the gas-liquid-solid three-phase mixture after reaction.

Figure 2:
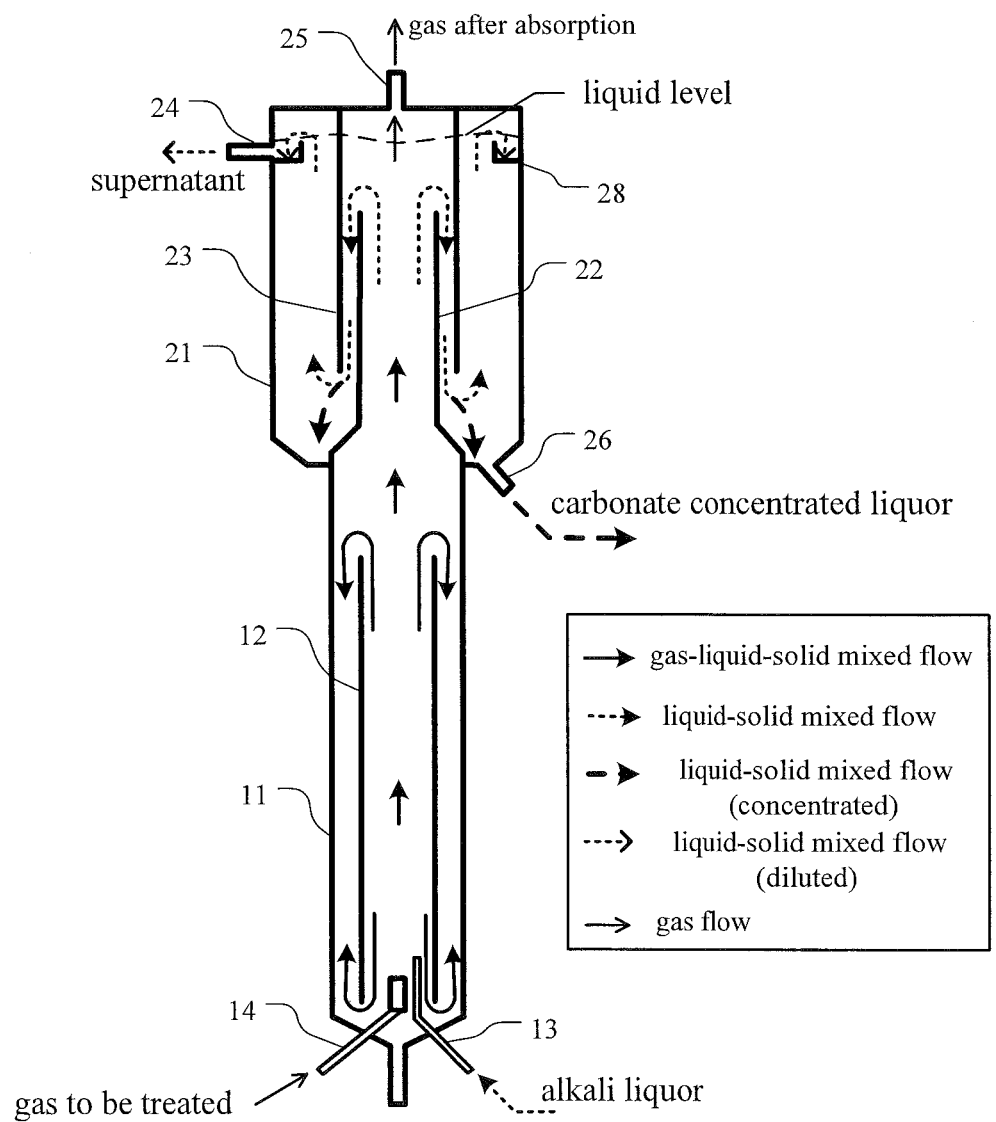
FIG. 2 is a schematic view of the process for treatment of carbon dioxide by use of the reactor for carbon dioxide absorption and mineral carbonation of the present invention.

The method for carbon dioxide absorption by use of the reactor for carbon dioxide absorption and mineral carbonation provided in present invention is as followed:

As shown in FIG. 2, firstly, the alkali liquor is passed through the liquid inlet pipe 13 at a certain flow rate into the tower body 11, until the liquid level is higher than the outlet end of the liquid inlet pipe 13, the gas containing carbon dioxide to be treated is passed through the gas intake pipe 14 at a certain flow rate into the tower body 11. Carbon dioxide in the gas reacts with the alkali liquor to produce carbonate, the gas after removal of carbon dioxide escapes from the liquid before discharging from the gas outlet 25, in the liquid overflow of gas; The liquid level within the tower body 11 continues to rise along with continuous alkali liquor inlet, while the liquid level is above the riser tube 22, the liquid containing carbonate particles passes through down flow channel 20 into the setting zone 27, after settling in the setting zone 27, the carbonate particles are settled to the bottom of the setting zone 27, the upper liquid in the upper part of the setting zone 27 forms supernatant, The bottom liquid containing carbonates, the carbonate is discharged from the second drain pipe 26, and subjected to further concentration treatment to obtain solid carbonate; the supernatant in the upper part of the setting zone 27 is discharged from the first drain pipe 24, and then recycled into the alkali liquor preparation system, thus completing gas-liquid-solid three-phase separation.

In the tower body 11, since the introduction of gas holding causes the average density of the gas-liquid-solid mixture within the draft tube 12 to be less than the density that of the mixture between the draft tube 12 and tower body 11, under the action of density difference, circulating loop current flow around the draft tube 12 as shown in FIG. 2 can be produced, such circulating current loop flow can improve the contact of gas-liquid-solid three-phase, thereby increasing the absorptivity absorption of carbon dioxide and the solubility of solute in the alkali liquor.

The alkali liquor described in the present invention is capable of reacting with carbon dioxide to form insoluble alkaline solution of carbonate, preferably a supersaturated solution, for example:

1. The alkali liquor is a suspension of calcium, magnesium hydroxide, i.e., a suspension of calcium hydroxide, magnesium hydroxide and a mixture of both in any proportion, wherein the content of hydroxide is 1 to 1500 times of its saturation solubility;
2. The alkali liquor is a suspension of calcium, magnesium hydroxide and a mixture of salts thereof (hydrochloride or sulfate), wherein the content of the hydroxide is 1 to 1,500 times of its saturation solubility, the molar ratio of salts to hydroxides is 0:1 to 4:1;
3. The alkali liquor is a solution of weak acid salt of calcium and magnesium, in which pKa value (273 K) of the acid corresponding to the acid radical is greater than pKa value of carbonic acid;
4. The alkali liquor is aqueous ammonia dissolved with calcium, magnesium salts (hydrochloride or sulfate), the mass fraction of ammonia is 2 to 20%, and the molar ratio of salts to ammonia is 0.2:1 to 2:1;
5. The alkali liquor is ethanolamine, diethanolamine, or a mixture of methyldiethanolamine with aqueous solution of sulphate or hydrochloride of calcium and/or magnesium, the mass fraction of ethanolamine, diethanolamine, or methyldiethanolamine is 5 to 30%, the molar ratio of the salts to said alcohol amine is 0.2:1 to 2:1.

When the alkali liquor is above mentioned solution, the flow rate of the alkali liquor is as followed: the ratio of the flow rate (molar flow rate) calculated with hydroxide radical, or ammonia, or amine group to the flow rate (molar flow rate) of carbon dioxide is 0.5:1 to 4:1; if the weak acid radicals are contained, the ratio of flow rate (molar flow rate) of weak acid radical to the flow rate (molar flow rate) of carbon dioxide is 2:1 to 10:1.

The gases to be treated include various gases with main components of carbon dioxide and air, such as flue gas, etc., wherein the volume content fraction of carbon dioxide is 0.05% to 20%. Ventilation of gas to be treated (in terms of carbon dioxide) is 0.02 to 0.2 times of the unit volume of carbon dioxide inlet per minute per unit volume of the reaction zone; superficial gas velocity calculated with whole gas volume is 0.5~8 cm/s. Absorption and carbonation conversion reactions may be operated under the in atmospheric pressure operation, and may also be operated under in pressurized operation condition.

The reactor for carbon dioxide absorption and mineral carbonation of the present invention is described in details with following specific Examples:

Example 1: Absorption and Mineral Carbonation of Carbon Dioxide with an Suspension of $Ca(OH)_2$ Parameters of the reactor for carbon dioxide absorption and mineral carbonation employed in present invention are as followed:

Total volume of the reactor was 65 L, wherein the volume of reactor 1 was 25 L, the volume of the three-phase separator 2 was 40 L (wherein the volume of setting zone 27 was 34 L). The height of tower body 11 was 1160 mm, with a diameter of 160 mm (the ratio of diameter to height being of 7.25:1); the height of draft tube 12 was 1120 mm (the height ratio of draft tube 12 to tower body 11 being of 0.97:1), the diameter was 114 mm (with a ratio to tower body diameter of 0.72:1). A Sieve pores was were arranged at 420 mm from the top of the draft tube 12, the area of the all the sieve pores through hole was 27% of cross-sectional area of draft tube 12.

The gas distributor 15 was a microporous distributor, with a distance from the lower edge of the draft tube 12 of 50 mm. The liquid inlet pipe 13 was located at the lower portion in the draft tube 12 and above the gas distributor 15.

The diameter (inner diameter) of the housing 21 of three-phase separator 2 was 330 mm (with a ratio to diameter of the tower body 11 of 2.1 to 1); the height of housing 21 was 510 mm (with a ratio to the height of tower body 11 of 1:2.1); the riser tube 22 had a diameter of 120 mm, a height of 280 mm; the downcomer 23 had a diameter of 180 mm, a height of 360 mm; the ratio of the cross-sectional area of setting zone 27 to the cross-sectional area of tower body 11 was 3.6:1, the ratio of the cross-sectional area of downcomer 23 to the cross-sectional area of setting zone 27 was 1:5.6. The opening of overflow weir 29 was located above the opening of riser tube 22, with a distance from the upper side of riser tube 22 of 80 mm, the overflow weir 28 had a height of 35 mm, and the overflow groove 29 had a width of 20 mm.

The absorption reaction was carried out at 25° C., the gas to be treated was a mixed gas of air and carbon dioxide, wherein the volume fraction of carbon dioxide was 10%, the flow rate of gas to be treated was 10 L/min (superficial gas velocity of 4.7 cm/s). The concentration and flow rate of the suspension of $Ca(OH)_2$ were determined according to the following three protocols: A) the content of 10 g/L (equivalent to 6.7 times of the saturated solubility), the flow rate of 36 L/h; B) the content of 20 g/L (equivalent to 13.3 times of the saturated solubility), the flow rate of 24 L/h; C) the content of 50 g/L (equivalent to 33.3 times of the saturated solubility), the flow rate of 12 L/h. The absorptivity of carbon dioxide was defined as:

Absorptivity=(1−flow rate of carbon dioxide in the exhaust gas/flow rate of carbon dioxide in the gas introduced into the reactor)×100%

For the three protocols, the absorptivity of carbon dioxide and the mass fraction of carbonate concentrate in the solution of carbonate are shown in Table 1.

TABLE 1

The results of absorbing $CO_2$ with an suspension of $Ca(OH)_2$

|  | Scheme A | Scheme B | Scheme C |
|---|---|---|---|
| Absorptivity of $CO_2$ | 72% | 76% | 74% |
| Mass fraction of carbonate | 69% | 73% | 65% |

Example 2: Absorption and Mineral Carbonation of Carbon Dioxide with a Suspension of $Ca(OH)_2$ The reactor is the same as described in Example 1. The absorption reaction was carried out at 25° C., the content of $Ca(OH)_2$ suspension was 20 g/L; the gas to be treated was a mixed gas of air and carbon dioxide, with a flow rate of 10 L/min (superficial gas velocity of 4.7 cm/s), there were three operating protocols of different volume fractions of carbon dioxide: A) the volume fraction of carbon dioxide in the gas to be treated was 5%, with a suspension flow rate of 12 L/h; B) the volume fraction of carbon dioxide in the gas to be treated was 10%, with a suspension flow rate of 24 L/h; C) the volume fraction of carbon dioxide in the gas to be treated was 20%, with a suspension flow rate of 48 L/h. For the three protocols, the absorptivity of carbon dioxide and carbonate contents in concentrated carbonate liquor were shown in Table 2.

TABLE 2

The results of absorbing $CO_2$ with an suspension of $Ca(OH)_2$

|  | Scheme A | Scheme B | Scheme C |
|---|---|---|---|
| Absorptivity of $CO_2$ | 68% | 76% | 72% |
| Mass fraction of carbonate | 71% | 73% | 64% |

Example 3: Absorption and Mineral Carbonation of Carbon Dioxide with a Suspension of Mixed $Mg(OH)_2$ or $Mg(OH)_2$ and $Ca(OH)_2$ The reactor is the same as described in Example 1. The absorption reaction was carried out at 25° C., the gas to be treated was a mixed gas of air and carbon dioxide, in which the volume fraction of carbon dioxide was 10%, and the flow rate of the gas to be treated was 10 L/min (superficial gas velocity of 4.7 cm/s). The content and flow rate of the suspension were determined according to the following three protocols: A) the content of $Mg(OH)_2$ was 5 g/L (equivalent to 750 times of the saturated solubility thereof), the flow rate was 60 L/h; B) the content of $Mg(OH)_2$ was 10 g/L (equivalent to 1500 times of the saturated solubility), the flow rate was 36 L/h; C) the content of $Mg(OH)_2$ was 10 g/L, the content of $Ca(OH)_2$ was 10 g/L, total flow rate was 30 L/h. In the three protocols, the absorptivity of carbon dioxide and carbonate contents in concentrated carbonate liquor was shown in Table 3.

TABLE 3

The results of absorbing $CO_2$ with a suspension of $Mg(OH)_2$ or $Mg(OH)_2$ and $Ca(OH)_2$

|  | Scheme A | Scheme B | Scheme C |
|---|---|---|---|
| Absorptivity of $CO_2$ | 70% | 72% | 76% |
| Mass fraction of carbonate | 72% | 71% | 69% |

Example 4: Absorption and Mineral Carbonation of $CO_2$ with a Suspension of $CaCl_2$ and $Mg(OH)_2$ The reactor is the same as described in Example 1. The absorption reaction was carried out at 25° C., the gas to be treated was a mixed gas of air and carbon dioxide, in which the volume fraction of carbon dioxide was 10%, and the flow rate of the gas to be treated was 10 L/min (superficial gas velocity of 4.7 cm/s). The flow rate of the suspension is 60 L/h, the contents had three protocols: A) the content of $Mg(OH)_2$ in the suspension was 5 g/L, the content of $CaCl_2$ was 15 g/L, the flow rate was 60 L/h; B) the content of $Mg(OH)_2$ in the suspension was 5 g/L, the content of $CaCl_2$ was 20 g/L, the flow rate was 60 L/h; C) the content of $Mg(OH)_2$ was 10 g/L, the content of $Ca(OH)_2$ was 30 g/L, the flow rate was 26 L/h. In For the three protocols, the absorptivity of carbon dioxide and carbonate contents in concentrated carbonate liquor was shown in Table 4.

TABLE 4

The results of absorbing $CO_2$ with a suspension of $Mg(OH)_2$ and $CaCl_2$

|  | Scheme A | Scheme B | Scheme C |
|---|---|---|---|
| Absorptivity of $CO_2$ | 68% | 66% | 70% |
| Mass fraction of carbonate | 72% | 76% | 71% |

Example 5: Absorption and Mineral Carbonation of $CO_2$ with a Suspension of $CaCl_2$ and $Mg(OH)_2$ The structure parameters of the reactor employed in this example are as follows:

Total volume of the reactor was 246 L, wherein the volume of reactor 1 was 104 L, the volume of the three-phase separator 2 was 142 L (wherein the volume of setting zone 27 is 125 L). Tower body 11 had a height of 2100 mm, had a diameter of 250 mm (with ratio of diameter to height of 8.4:1); the height of said draft tube 12 was 1800 mm (with a ratio of draft tube 12 to tower body 11 of 0.85:1), the diameter of the draft tube 12 was 180 mm, the sieve pores were arranged at 740 mm from the top of the draft tube 12, the cross sectional area of all the sieve pores was 32% of that of the draft tube 12.

The gas distributor 15 was a microporous distributor, with a distance from the lower edge of the draft tube 12 of 100 mm.

The diameter (inner diameter) of housing 21 of three-phase separator 2 was 480 mm (with a diameter ratio to the tower body 11 of 2.1~1); the housing 21 had a height of 840 mm (with a height ratio to the tower body 11 of 1:2.5); the riser tube 22 had a diameter of 200 mm, a height of 580 mm; the downcomer 23 had a diameter of 280 mm, a height of 500 mm; the ratio of the cross sectional area of the setting zone 27 to that of the tower body 11 was 3.0:1, the ratio of the cross sectional area of the downcomer 23 to that of the setting zone 27 was 1:5. The opening of the overflow weir 29 was located above the opening of riser tube 22, with a distance from the upper edge of riser tube 22, the overflow weir 28 had a height of 50 mm, and the overflow weir 29 had a width of 50 mm.

Absorption reaction was carried out at 25° C., the gas to be treated was a mixture of air and carbon dioxide, wherein the volume fraction of carbon dioxide was 10%, the flow rate of gas to be treated was 29 L/min (with a superficial gas velocity of 5.9 cm/s). The content of $Mg(OH)_2$ in the suspension was 10 g/L, and the content of $CaCl_2$ was 30 g/L, the flow rate of the suspension was 90 L/h. In these conditions, the absorptivity of carbon dioxide was 73%, the mass fraction of $CaCO_3$ in the carbonate concentrated liquor was 62%, and the mass fraction of $MgCO3$ was 6%.

Example 6: Absorption and Mineral Carbonation of Carbon Dioxide with Methyl Diethanolamine (MDEA) Solution and $CaCl_2$ Solution The reactor was the same as described in Example 1. Absorption reaction was carried out at 25° C., the gas to be treated was a mixture of air and carbon dioxide, wherein the volume fraction of carbon dioxide was 15%, the flow rate of gas to be treated was 10 L/min (with a superficial gas velocity of 4.7 cm/s). The mass fraction of methyl diethanolamine solution was 10%, and the flow rate was 18 L/h; the mass fraction of $CaCl_2$ solution was 20%, and the flow rate was 2.5 L/h. In these conditions, the absorptivity of carbon dioxide was 88%, the conversion rate of carbon dioxide to $CaCO_3$ was 89%, and the mass fraction of $CaCO_3$ in the $CaCO_3$ concentrated liquor was 62%.

Example 7: Absorption of the $CO_2$ with Calcium Acetate

The reactor was the same as described in Example 1. Absorption reaction was carried out at 40° C., the pressure in the reactor was 0.3 MPa (gauge pressure), the gas to be treated was a mixed gas of nitrogen and carbon dioxide, wherein the volume fraction of carbon dioxide was 15%, the flow rate of the gas to be treated was 8 L/min (standard conditions). The absorption liquor was calcium acetate $Ca(CH3COO)2$ solution, the content thereof was 180 g/L, with a flow rate of 12 L/h. In these conditions, the absorptivity of carbon dioxide was 65%, the mass fraction of $CaCO_3$ in $CaCO_3$ concentrated liquor was 59%.

It should be noted that, as used herein, relational terms such as first and second, and the like are used solely to separate an entity or operation from another entity or operation, and do not necessarily require or imply the existence of any such actual relationship or order among these entities or operations.

Finally, it should be noted that: obviously, the above-described Examples are made by way of example, merely illustrative of the invention clearly, and are not limitation to the embodiments. For those ordinarily skilled in the art, based on the above description, other changes or modification in various forms can also be made. Herein, it is unnecessary and impossible to be exhaustive of all embodiments. And the apparent changes and modifications derived therefrom still fall within the protection extent of the present invention.

What is claimed is:

1. An apparatus for absorbing and mineralizing carbon dioxide is characterized in comprising a reactor and a three phase separator, said reactor is arranged vertically and comprises a tower body and a draft tube, said draft tube being coaxially disposed inside said tower body, a liquid inlet pipe and a gas intake pipe being disposed on said tower body, the outlet ends of said liquid inlet pipe and said gas intake pipe both passing through said tower body and being located inside said draft tube; said three-phase separator includes a housing, a riser tube and a downcomer, the lower end of said housing being connected to the upper end of said reactor, the lower end of said riser tube communicating with the reactor, with the upper end extending inside said downcomer, an opening being disposed at lower end of said downcomer, a down flow channel being formed between said riser tube and said downcomer; a setting zone being formed between said housing and said downcomer, said down flow channel communicating with the setting zone.

2. The apparatus for absorbing and mineralizing carbon dioxide according to claim 1 is characterized in that said draft tube is provided with openings at the upper and the lower ends, the outlets of said liquid inlet pipe and said gas intake pipe being located inside the opening of the lower end of said draft tube, and the outlet of said liquid inlet pipe being located above the outlet of said gas intake pipe.

3. The apparatus for absorbing and mineralizing carbon dioxide according to claim 2 is characterized in that a gas distributor is provided at the outlet of said liquid inlet pipe.

4. The apparatus for absorbing and mineralizing carbon dioxide according to claim 1 is characterized in that said tower body and said draft tube are both cylindrical configuration, with a height ratio of 0.5:1 to 0.8:1 and a diameter ratio of 0.6:1 to 0.75:1 thereof.

5. The apparatus for absorbing and mineralizing carbon dioxide according to claim 1 is characterized in that sieve pores are provided on said draft tube, the area of said sieve pores is less than 0.4 times of the cross-sectional area of said draft tube.

6. The apparatus for absorbing and mineralizing carbon dioxide according to claim 1 is characterized in that said three phase separator comprises a first drain pipe, a gas outlet and a second drain pipe, said first drain pipe being used for discharging supernatant liquid in the three-phase separator, said gas outlet being used for discharging the treated gas, and said second drain pipe being used for discharging bottom liquid in said three-phase separator.

7. The apparatus for absorbing and mineralizing carbon dioxide according to claim 6 is characterized in that said first drain pipe and second drain pipe are located on upper portion and bottom portion of said setting zone, respectively, and said gas outlet is located at the upper end of said housing.

8. The apparatus for absorbing and mineralizing carbon dioxide according to claim 1 is characterized in that the ratio of the cross-sectional area of said setting zone along radial direction of said housing to that along radial direction of said tower body is 1.5:1 to 4:1.

9. The apparatus for absorbing and mineralizing carbon dioxide according to claim 8 is characterized in further comprising an overflow weir, said overflow weir is disposed inside said housing along the circumferential direction, and fixed on lower side of said first drain pipe.

10. The apparatus for absorbing and mineralizing carbon dioxide according to claim 9 is characterized in that an overflow groove with an upward opening is formed by said overflow weir and inner wall of the housing, the height difference between the opening edge of said overflow groove and the upper end of the riser tube is 0.3 to 1 times of the diameter of said riser tube.

11. A method for absorbing and mineralizing carbon dioxide is characterized in that carbon dioxide is absorbed and mineralized with alkali liquor by using the apparatus for absorbing and mineralizing carbon dioxide in any of claims 1 to 10; the volume faction of carbon dioxide in the gas to be treated is 0.05% to 20%, the volume of carbon dioxide intake per minute is 0.02 to 0.2 times of the volume of said reactor; the superficial gas velocity calculated by entirety of volume is 0.5~8 cm/s.

12. The method for absorbing and mineralizing carbon dioxide according to claim 11 is characterized in that said alkali liquor reacts with carbon dioxide to generate a solution or suspension of insoluble carbonate matter.

13. The method for absorbing and mineralizing carbon dioxide according to claim 12 is characterized in that said alkali liquor is a suspension of calcium and/or magnesium hydroxide wherein the content of hydroxide is 1~1500 times of its saturation solubility; the ratio of the molar flow rate of the hydroxide ion to the molar flow rate of the carbon dioxide is 0.5:1 to 4:1.

14. The method for absorbing and mineralizing carbon dioxide according to claim 12 is characterized in that said alkali liquor is a suspension of mixture of calcium and/or magnesium hydroxide and hydrochloride or sulfate of calcium and/or magnesium, in which the content of the hydroxide is 1 to 1,500 times of its saturation solubility thereof, the molar ratio of salts to hydroxides is 0:1 to 4:1; the ratio of molar flow rate of hydroxide ion to the molar flow rate of carbon dioxide is 0.5:1 to 4:1.

15. The method for absorbing and mineralizing carbon dioxide according to claim 12 is characterized in that said alkali liquor is a solution of weak acid salt of calcium and/or magnesium, the pKa value of the acid corresponding to weak acid radical contained is greater than the pKa value of carbonic acid; and the ratio of the molar flow rate of the weak acid radical to the molar flow rate of carbon dioxide is 2:1 to 10:1.

16. The method for absorbing and mineralizing carbon dioxide according to claim 12 is characterized in that said alkali liquor is aqueous ammonia dissolved with hydrochloride or sulfate of calcium and/or magnesium, the mass fraction of ammonia is 2 to 20%, the molar ratio of salt to ammonia is 0.2:1 to 2:1; the ratio of molar flow rate of ammonia to molar flow rate of carbon dioxide is 0.5:1 to 4:1.

17. The method for absorbing and mineralizing carbon dioxide according to claim 12 is characterized in that said alkali liquor is ethanolamine, diethanolamine, or a mixture of methyldiethanolamine with aqueous solution of sulphate or hydrochloride of calcium and/or magnesium, the mass fraction of ethanolamine, diethanolamine, or methyldiethanolamine is 5 to 30%, the molar ratio of the salts to said alcohol amine is 0.2:1 to 2:1; and the ratio of molar flow rate of amine group to molar flow rate of carbon dioxide is 0.5:1 to 4:1.

* * * * *